(12) United States Patent
Jensen

(10) Patent No.: US 7,634,638 B1
(45) Date of Patent: Dec. 15, 2009

(54) INSTRUCTION ENCODING FOR SYSTEM REGISTER BIT SET AND CLEAR

(75) Inventor: Michael Gottlieb Jensen, Sunnyvale, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 405 days.

(21) Appl. No.: 10/279,210

(22) Filed: Oct. 22, 2002

(51) Int. Cl.
*G06F 9/00* (2006.01)
*G06F 13/24* (2006.01)
(52) U.S. Cl. .................... 712/224; 712/244; 710/262
(58) Field of Classification Search .............. 710/262; 712/244, 224
See application file for complete search history.

(56) References Cited

U.S. PATENT DOCUMENTS

| | | |
|---|---|---|
| 3,828,327 A | 8/1974 | Berglund et al. |
| 4,400,769 A | 8/1983 | Kaneda et al. |
| 4,949,238 A | 8/1990 | Kamiya |
| 5,109,489 A | 4/1992 | Umeno et al. |
| 5,148,544 A | 9/1992 | Cutler et al. |
| 5,210,874 A | 5/1993 | Karger |
| 5,345,567 A | 9/1994 | Hayden et al. |
| 5,381,540 A | 1/1995 | Adams et al. |
| 5,572,704 A | 11/1996 | Bratt et al. |
| 5,621,886 A | 4/1997 | Alpert et al. |
| 5,623,636 A | 4/1997 | Revilla et al. |
| 5,632,025 A | 5/1997 | Bratt et al. |
| 5,655,135 A | 8/1997 | Sholander et al. |
| 5,701,493 A | 12/1997 | Jaggar |
| 5,701,501 A * | 12/1997 | Gandhi ........................ 712/203 |
| 5,740,451 A * | 4/1998 | Muraki et al. ................ 710/260 |
| 5,742,780 A | 4/1998 | Caulk, Jr. |
| 5,764,969 A | 6/1998 | Kahle et al. |
| 5,768,599 A * | 6/1998 | Yokomizo .................... 710/260 |
| 5,805,918 A | 9/1998 | Blomgren et al. |
| 5,887,175 A | 3/1999 | Col et al. |
| 5,911,065 A * | 6/1999 | Williams et al. ............. 718/107 |
| 6,061,709 A * | 5/2000 | Bronte ........................ 718/103 |

(Continued)

OTHER PUBLICATIONS

Weaver, David L., Germond, Tom. "The SPARC Architectural Manual." Version 9. SPARC International, Inc. 1994.*

(Continued)

*Primary Examiner*—Eddie P Chan
*Assistant Examiner*—Jacob Petranek
(74) *Attorney, Agent, or Firm*—Sterne, Kessler, Goldstein & Fox PLLC

(57) ABSTRACT

An instruction encoding architecture is provided for a microprocessor to allow atomic modification of privileged architecture registers. The instructions include an opcode that designates to the microprocessor that the instructions are to execute in privileged (kernel) state only, and that the instructions are to communicate with privileged control registers, a field for designating which of a plurality of privileged architecture registers is to be modified, a field for designating which bit fields within the designated privileged architecture register is to be modified, and a field to designate whether the designated bit fields are to be set or cleared. The instruction encoding allows a single instruction to atomically set or clear bit fields within privileged architecture registers, without reading the privileged architecture registers into a general purpose register. In addition, the instruction encoding allows a programmer to specify whether the previous content of a privileged architecture register is to be saved to a general purpose register during the atomic modification.

12 Claims, 6 Drawing Sheets

U.S. PATENT DOCUMENTS

| | | | |
|---|---|---|---|
| 6,249,881 B1* | 6/2001 | Porten et al. | 714/38 |
| 6,282,657 B1 | 8/2001 | Kaplan et al. | |
| 6,341,324 B1 | 1/2002 | Caulk et al. | |
| 6,393,556 B1 | 5/2002 | Arora | |
| 6,397,379 B1 | 5/2002 | Yates et al. | |
| 6,496,912 B1 | 12/2002 | Fields et al. | |
| 6,532,533 B1* | 3/2003 | Bhandal et al. | 712/225 |
| 6,560,698 B1 | 5/2003 | Mann | |
| 6,666,383 B2 | 12/2003 | Goff et al. | |
| 6,732,298 B1* | 5/2004 | Murthy et al. | 714/34 |
| 6,763,450 B1* | 7/2004 | Miyaguchi et al. | 712/215 |
| 6,772,326 B2* | 8/2004 | Chauvel et al. | 712/244 |
| 6,779,065 B2* | 8/2004 | Murty et al. | 710/260 |
| 6,820,153 B2* | 11/2004 | Yanagi et al. | 710/260 |
| 6,842,811 B2* | 1/2005 | Barry et al. | 710/260 |
| 7,181,600 B1 | 2/2007 | Uhler | |
| 7,185,183 B1 | 2/2007 | Uhler | |
| 2002/0016883 A1 | 2/2002 | Musoll et al. | |

OTHER PUBLICATIONS

RISC Microprocessor Databook, 32-Bit TX System RISC TX39 Family TX39/H2 Processor Core, Chapter 1-8, Appendix A, Doc. ID 4412D-9908 (1998).

Toshiba Data sheet List;http://www.seicon.toshiba.co/jp/eng/prd/micro/td/td_all.html; Toshiba Semiconductor Company.

Alpha Architecture Handbook (Oct. 1996). pp. 11-2 and C-20.

CompactRISC CR16A Programmer's Reference Manual (Feb. 1997); pp. 2-6, 3-3, 5-12, and 5-13.

Richard L. Sites, Richard T. Witek, Alpha AXP Architecture Reference Manual Second Edition, Copyright 1995, p. 2-19.

U.S. Appl. No. 09/592,106, filed Jun. 12, 2000, Melvin et al.

Alpha Architecture Handbook (Oct. 1996). Digital Equipment Corporation. Maynard, Massachusetts.

Intel, *IAPX88 Book with an Introduction to the IAPX88*, 1983, INTEL, pp. 2-1 to 2-17, 2-64, 2-154, 47, 48, to 49, 62, 63.

MIPS32™ Architecture for Programmers vol. I: Introduction to the MIPS32™ Architecture, MIPS Technologies, Inc. (2002), 91 pages.

MIPS32™ Architecture for Programmers vol. II: The MIPS32™ Instruction Set, MIPS Technologies, Inc. (2002), 334 pages.

MIPS32™ Architecture for Programmers vol. III: The MIPS32™ Privileged Resource Architecture, MIPS Technologies, Inc. (2002), 137 pages.

MIPS64™ Architecture for Programmers vol. I: Introduction to the MIPS64™ Architecture, MIPS Technologies, Inc. (2002), 89 pages.

MIPS64™ Architecture for Programmers vol. II: The MIIPS64™ Instruction Set, MIPS Technologies, Inc. (2002), 344 pages.

MIPS64™ Architecture for Programmers vol. III: the MIPS64™ Privileged Resource Architecture, MIPS Technologies, Inc. (2002), 119 pages.

* cited by examiner

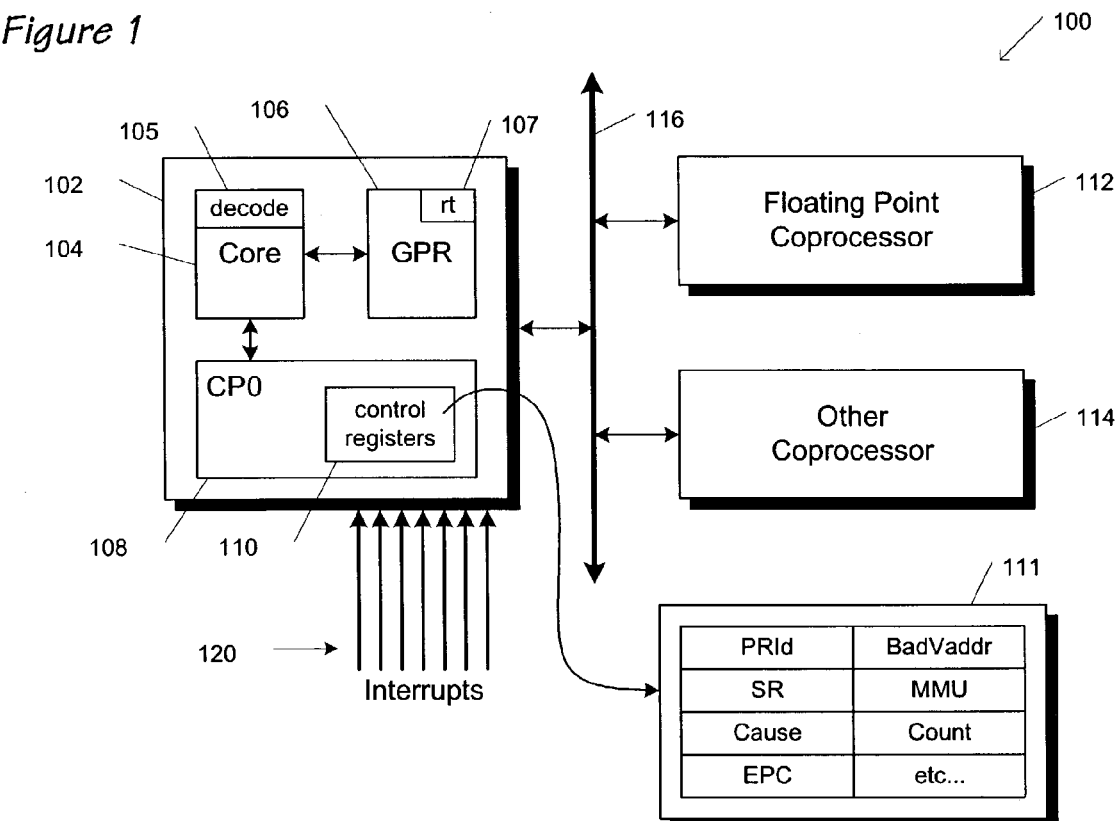

INSTRUCTION ENCODING FOR SYSTEM REGISTER BIT SET AND CLEAR

CROSS REFERENCE TO RELATED APPLICATION(S)

This application is related to U.S. patent application Ser. No. 09/921,400 entitled "ATOMIC UPDATE OF CP0 STATE" assigned to MIPS Technologies, Inc.

FIELD OF THE INVENTION

This invention relates in general to the field of computer architecture, and more specifically to a method and apparatus for instruction encoding to allow atomic updating of specified bit fields within privileged architecture registers in a microprocessor.

BACKGROUND OF THE INVENTION

A microprocessor is a digital device that is utilized to execute instructions defined within a computer program. Such instructions include adding two data values together, comparing data values, moving data from one location to another, etc. In addition, a microprocessor is designed to communicate with other devices, such as network controllers, disk drives, keyboards, displays, etc., that are external to it. Typically, such external devices request the attention of the microprocessor by signaling one of several interrupt lines on the microprocessor. When this occurs, the microprocessor halts program execution, runs a special program called an "exception handler" to determine which device requested the interrupt, and what the nature of the interrupt is. Once the microprocessor has determined the nature of the interrupt, it executes an interrupt routine that is specific to the nature of the interrupt. Upon completion, the microprocessor typically returns to the program it was executing before the interrupt occurred.

One skilled in the art will appreciate that the above description of interrupt handling is very simplistic. That is, it has not considered the difference between hardware interrupts, software interrupts, internal exceptions, etc., nor has it considered what occurs when multiple interrupts occur simultaneously, or when a second interrupt occurs during processing of a first interrupt. However, the way a microprocessor handles an interrupt is, in many ways, dependent on the specific architecture of the microprocessor. For purposes of illustrating the present invention, an interrupt problem will be described with particular reference to the architecture of MIPS32™ and MIPS64™ microprocessors (hereinafter MIPS® microprocessors) designed by MIPS Technologies, Inc. of Mountain View, Calif.

More specifically, like many modern microprocessors, MIPS microprocessors contain privileged architecture registers that are updated during events such as interrupts and exceptions. These registers are not directly accessible by user programs that execute on the microprocessors. Rather, when an interrupt or exception occurs, program execution is halted, and a special program, called an exception handler, is run which accesses the privileged architecture registers, both to determine the nature of the interrupt, and to set or clear bits within one or more of the registers, which control how the interrupt will be handled. (Note: The exception handler typically resides within an area of memory that can only be accessed by the microprocessor if it is in "kernel" mode. That is, to prevent user programs from accessing or changing the contents of the privileged architecture registers, a task switch must first occur which authorizes the execution of the exception handler, and thus access to the registers.) Once the exception handler has read the appropriate privileged registers, and established how the interrupt will be handled, an interrupt service routine is used to service the interrupt. Upon completion of servicing the interrupt, the exception handler returns execution to the user program.

A particular privileged architecture register within a MIPS microprocessor is called the status register (SR). The SR contains a number of bit fields that may be examined, and set or cleared, during handling of an interrupt. Like most privileged architecture registers, the SR register cannot be modified directly. Rather, the process for examining and modifying the contents of the SR register involves the steps of: 1) Reading the contents of the SR register into one of the general purpose registers within the microprocessor; 2) Modifying, or setting/clearing particular bits within the general purpose register that contains the contents of the SR register; and 3) Writing the modified contents of the general purpose register back into the SR register. This three-step process is referred to as a R-M-W sequence, and is often required during interrupt processing.

Sample program code that performs this R-M-W sequence is shown below:

| Label | Instruction | Operands |
|---|---|---|
| 1: | mfc0 | t0, SR |
|  | or | t0, things_to_set |
|  | and | t0, things_to_preserve |
| 2: | mtc0 | t0, SR |

The first instruction "mfc0" causes the microprocessor to move the contents of the SR register into a general purpose register designated t0. This is the read cycle. The next two instructions "or" and "and" set or preserve particular bits within the t0 register, corresponding to the "things_to_set" mask, or the "things_to_preserve" mask. This is the modify cycle. The fourth instruction "mtc0" causes the microprocessor to move the contents of the t0 register back into the SR register. This is the write cycle. Specifics relating to which of the SR bits are modified during an interrupt, how the above instructions operate and other information related to the MIPS32 and MIPS64 architectures can be found in the following references, each of which is available from MIPS Technologies, Inc. and incorporated herein by reference in its entirety for all purposes:

1. MIPS32 Architecture For Programmers Volume I: Introduction to the MIPS32 Architecture, MIPS Technologies, Inc. (2002);
2. MIPS32 Architecture For Programmers Volume II: The MIPS32 Instruction Set, MIPS Technologies, Inc. (2002);
3. MIPS32 Architecture For Programmers Volume III: The MIPS32 Privileged Resource Architecture, MIPS Technologies, Inc. (2002);
4. MIPS64 Architecture For Programmers Volume I: Introduction to the MIPS64 Architecture, MIPS Technologies, Inc. (2002);
5. MIPS64 Architecture For Programmers Volume II: The MIPS64 Instruction Set, MIPS Technologies, Inc. (2002);
6. MIPS64 Architecture For Programmers Volume III: The MIPS64 Privileged Resource Architecture, MIPS Technologies, Inc. (2002);

During execution of an interrupt service routine, it may be desirable to perform the above described R-M-W sequence. One problem that exists is that the R-M-W sequence may itself be interrupted. For example, suppose that the R-M-W sequence described above is executing in response to a first interrupt. Further, suppose a second interrupt occurs between label 1 and label 2 above. The processor might halt execution of this R-M-W sequence and begin servicing the second interrupt. Now, suppose that while servicing the second interrupt, the contents of the SR register are changed. Upon return from servicing the second interrupt, the code at label 2 will write its altered value into SR, but will lose any changes made to the SR register by the second interrupt routine. Such a situation is unacceptable since changes to the SR register cannot be ignored.

In response to the above problem, several solutions have been developed to prevent changes in the SR register from being lost or ignored. A first solution is to simply disable all interrupts prior to performing the R-M-W sequence above. However, this situation is a catch-22, because in order to disable interrupts, interrupt mask bits in the SR register must be cleared, the clearing of which requires the same R-M-W sequence! What happens if an interrupt occurs while executing the R-M-W sequence that disables interrupts? One method of solving this problem is to insist that no interrupt change the value of SR during execution of any interrupt code. That is, by requiring that all interrupt code begin by saving off the value of SR, and end by restoring the saved value of SR back into SR, it can be assured that the SR value doesn't change. In many environments, however, this is considered too restrictive, as well as too time consuming. Moreover, in operating environments where interrupt routines are not strictly nested, you can never be sure you return to the spot where the proper SR value can be restored.

A second solution is to use a system call to disable interrupts. A system call works by causing an exception that disables interrupts in a single cycle. Then, the R-M-W sequence can proceed without risk of interruption. Many programmers consider use of a system call, to simply overcome the inherent problems of updating the SR register, overly dramatic, and again, too time consuming.

Therefore, what is needed is a mechanism that allows a programmer to set or clear bits within a privileged architecture register of a processor, while guaranteeing that the modification process is not interrupted.

Furthermore, what is needed is a method and apparatus that sets or clears selected portions of a privileged architecture register atomically (i.e., within a single non-interruptible instruction). By modifying privileged bits atomically, the above presented problems associated with the R-M-W sequence are solved without imposing any additional processing delays, and without insisting that interrupt routines be strictly nested.

Furthermore, what is needed is a method and apparatus for encoding within an instruction, what privileged architecture register is to be affected by the instruction, what bits are to be set or cleared within the control register, and where the previous contents of the control register are to be saved (if requested).

SUMMARY

The present invention provides a method and apparatus for encoding an instruction to atomically set or clear specified bits within a privileged architecture register when a microprocessor is in a privileged state.

In one aspect, the present invention provides a microprocessor having a privileged architecture register that is modifiable by instructions, the privileged architecture register having bit fields. The microprocessor includes an execution core that receives the instructions and modifies the privileged architecture register upon execution of the instructions. The instructions include a first operand which specifies the privileged architecture register as a register to be modified. The instructions further include a second operand which specifies a bit field within the privileged architecture register to be modified. The instructions further include a third operand which specifies whether the bit field is to be set or cleared. The bit field in the privileged architecture register is modified atomically when the instructions execute.

In another aspect, the present invention provides a method for atomically setting or clearing a bit field within a privileged architecture register of a microprocessor. The method includes: providing a privileged instruction which instructs the microprocessor to set or clear the bit field within the privileged architecture register. The privileged instruction includes: a first operand for specifying which one of a plurality of privileged architecture registers contains the bit field to be set or cleared, and a designator for specifying whether the bit field is to be set or cleared. The method further includes decoding the privileged instruction by examining the first operand to determine which one of the plurality of privileged architecture registers contains the bit field, and by examining the designator to determine whether the bit field is to be set or cleared; and executing the privileged instruction thereby causing the bit field to be atomically set or cleared according to the designator.

In a further aspect, the present invention provides a disable interrupt instruction for execution on a microprocessor, the microprocessor having a privileged architecture register. The disable interrupt instruction atomically executes on the microprocessor when the microprocessor is in a privileged state. The disable interrupt instruction includes an opcode an operand and a designator. The opcode specifies that a bit field within the privileged architecture register is to be modified. The operand specifies which one of a plurality of bit fields within the privileged architecture register is the bit field to be modified. The designator specifies that the modification to be performed on the specified bit field is to clear the bit field. When the disable interrupt instruction executes on the microprocessor, the specified bit field is cleared, atomically.

In a further aspect, the present invention provides a computer program product for use with a computing device. The computer program product includes: a computer usable medium, having computer readable program code embodied in said medium, for causing a microprocessor having a privileged architecture register that is modifiable by a plurality of instructions, the privileged architecture register having bit fields, to be described. The computer readable program code includes first program code for providing an execution core, for receiving the plurality of instructions and for modifying the privileged architecture register upon execution of one of the plurality of instructions; and second program code for providing the plurality of instructions. Each of the plurality of instructions includes: a first field, for specifying the privileged architecture register as a register to be modified; a second field, for specifying a bit within the privileged architecture register to be modified; and a third field, for specifying whether the bit is to be set or cleared. The bit in the privileged architecture register is modified atomically by the plurality of instructions.

In yet another aspect, the present invention provides a computer data signal embodied in a transmission medium comprising. The computer-readable program code provides a disable interrupt instruction for execution on a microprocessor, the microprocessor having a privileged architecture register, the disable interrupt instruction executing on the microprocessor when the microprocessor is in a privileged state. The program code includes first program code for providing an opcode for specifying that a bit field within the privileged architecture register is to be modified; second program code for providing an operand for specifying which one of a plurality of bit fields within the privileged architecture register is the bit field to be modified; and third program code for providing a designator, for specifying that the modification to be performed on the specified bit field is to clear the bit field. When the disable interrupt instruction executes on the microprocessor, the specified bit field is cleared, atomically.

Other features and advantages of the present invention will become apparent upon study of the remaining portions of the specification and drawings.

BRIEF DESCRIPTION OF THE DRAWINGS

FIG. 1 is a block diagram of a microprocessor coupled to Coprocessors according to the present invention.

FIG. 2 is a block diagram illustrating the bits of a Coprocessor 0 status register (SR).

DETAILED DESCRIPTION

Figure 3:
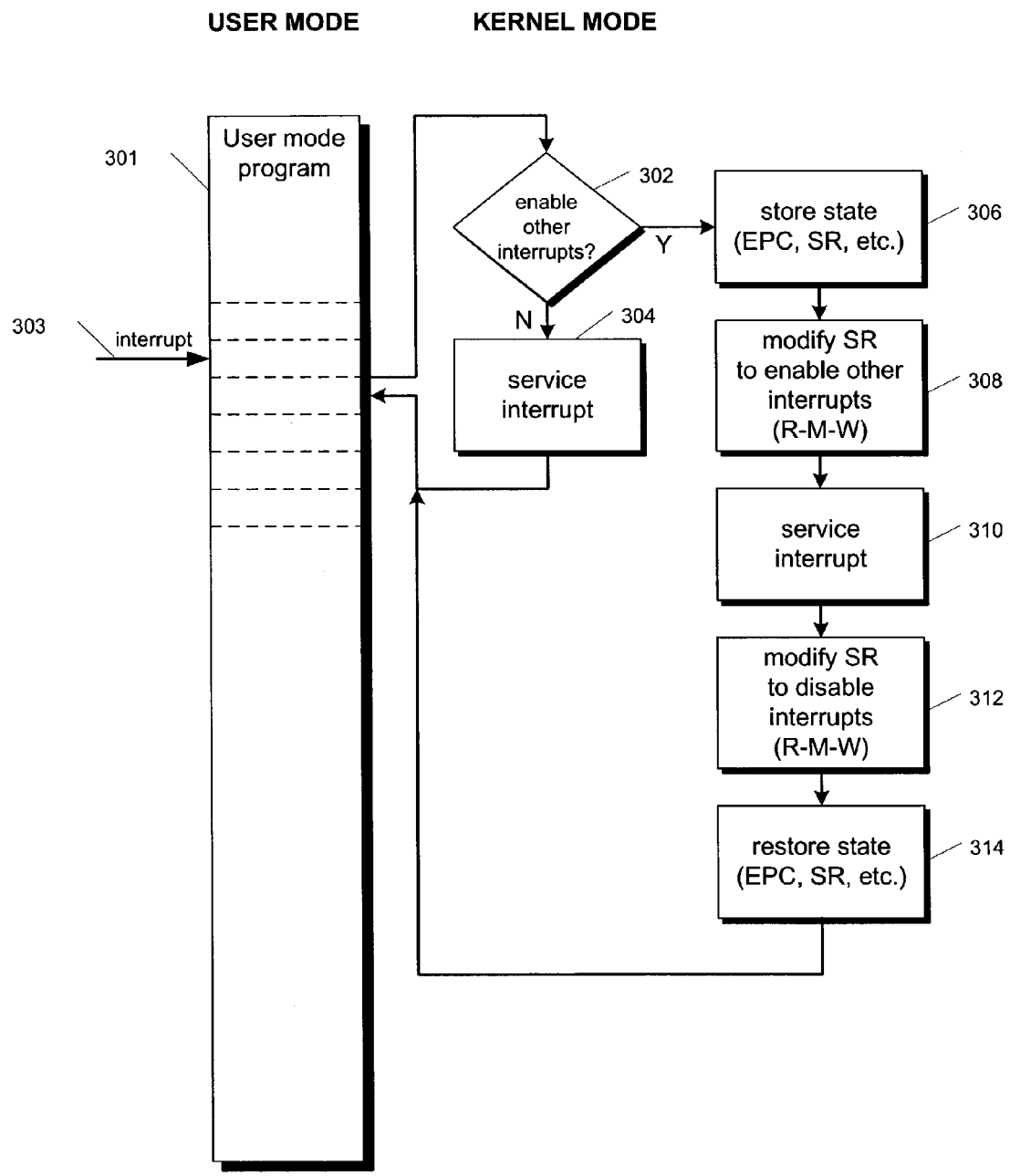
FIG. 3 is a flow chart illustrating a read-modify-write (R-M-W) sequence required for updating the status register in Coprocessor 0.

Referring to FIG. 1, a block diagram 100 is shown illustrating a microprocessor (or CPU) 102 coupled to a floating point Coprocessor 112 and a second Coprocessor 114 via an interface bus 116. In one embodiment, the second Coprocessor 114 may be a graphics Coprocessor, an audio Coprocessor, or any other Coprocessor capable of executing instructions not designed specifically for the CPU 102. The CPU 102 includes an execution core 104, having decode logic 105, coupled to a general purpose register file (GPR) 106 for receiving instructions from memory (or a cache) and for execution of CPU 102 instructions. One skilled in the art will appreciate that the execution core 104 includes one or more pipelines for executing instructions, including all states necessary to decode, execute and write back results. The GPR 106 has a number of architecturally visible registers, including a register rt 107. The decode logic 105 receives an instruction, and decodes bit fields in the instruction to allow the execution core 104 to execute the instruction. In one embodiment, the processor 102 is a RISC microprocessor, although one skilled in the art should appreciate that the present invention could also be implemented within a CISC processor, where the decode logic 105 acts as a translator between macro instructions and micro instructions.

When floating point instructions are presented to the core 104, it provides those instructions to the floating point Coprocessor 112 for execution. When instructions are presented to the core 104 that are designed for the second Coprocessor 114, the CPU 102 provides those instructions to the second Coprocessor 114. While the present invention is not restricted to any specific CPU, for purposes of discussion, the invention will be described with reference to the MIPS 32 and 64 bit processor architectures, available from MIPS Technologies, Inc. of Mountain View, Calif.

In addition to its normal computational functions, the CPU 102 includes a control unit to handle interrupts 120, configuration options e.g., such as the endianness of data, and observing or controlling on-chip functions like caches and timers. The control unit within the CPU 102 for performing such tasks is called Coprocessor 0 108, or CP0. CP0 108 is coupled to control registers 110 which contain values that set how the CPU 102 is to operate. A portion of the control registers are shown expanded out in block 111. Blocks 110 and 111 are equivalent, but block 111 particularly illustrates a portion of the control registers within the block 110, including: PRId, SR, Cause, EPC, BadVaddr, MMU, Count, and etc. . . . Etc. indicates that other control registers are within the block 110, but are not shown. For a complete listing of the control registers 110 within the MIPS 32/64 bit architecture, reference is made to Table 1 below. A complete description of each of these registers may be found in the MIPS32 and MIPS64 architecture Specifications, which are available from MIPS Technologies, Inc., and which are incorporated herein by reference for all purposes.

CP0 provides an abstraction of the functions necessary to support an operating system: exception handling, memory management, scheduling, and control of critical resources. The interface to CP0 is through various instructions encoded with a COP0 opcode, including the ability to move data to and from the control registers 110. The control registers 110 and the interaction with them make up what is called the Privileged Resource Architecture.

TABLE 1

| Register Number | Sel | Register Name | Function |
|---|---|---|---|
| 0 | 0 | Index | Index into the TLB array |
| 1 | 0 | Random | Randomly generated index into the TLB array |
| 2 | 0 | EntryLo0 | Low-order portion of the TLB entry for even-numbered virtual pages |
| 3 | 0 | EntryLo1 | Low-order portion of the TLB entry for odd-numbered virtual pages |
| 4 | 0 | Context | Pointer to page table entry in memory |
| 5 | 0 | PageMask | Control for variable page size in TLB entries |
| 6 | 0 | Wired | Controls the number of fixed ("wired") TLB entries |
| 7 | All | | Reserved for future extensions |
| 8 | 0 | BadVAddr | Reports the address for the most recent address-related exception |
| 9 | 0 | Count | Processor cycle count |
| 10 | 0 | EntryHi | High-order portion of the TLB entry |
| 11 | 0 | Compare | Timer interrupt control |
| 12 | 0 | Status | Processor status and control |
| 13 | 0 | Cause | Cause of last general exception |
| 14 | 0 | EPC | Program counter at last exception |
| 15 | 0 | PRId | Processor identification and revision |
| 16 | 0 | Config | Configuration register |

TABLE 1-continued

| Register Number | Sel | Register Name | Function |
|---|---|---|---|
| 16 | 1 | Config1 | Configuration register 1 |
| 17 | 0 | LLAddr | Load linked address |
| 18 | 0–n | WatchLo | Watchpoint address |
| 19 | 0–n | WatchHi | Watchpoint control |
| 20 | 0 | XContext | XContext in 64-bit implementations |
| 21 | All | | Reserved for future extensions |
| 22 | All | | Available for implementation dependent use |
| 23 | 0 | Debug | EJTAG Debug register |
| 24 | 0 | DEPC | Program counter at last EJTAG debug exception |
| 25 | 0–n | PerfCnt | Performance counter interface |
| 26 | 0 | ErrCtl | Parity/ECC error control and status |
| 27 | 0–3 | CacheErr | Cache parity error control and status |
| 28 | 0 | TagLo | Low-order portion of cache tag interface |
| 28 | 1 | DataLo | Low-order portion of cache data interface |
| 29 | 0 | TagHi | High-order portion of cache tag interface |
| 29 | 1 | DataHi | High-order portion of cache data interface |
| 30 | 0 | ErrorEPC | Program counter at last error |
| 31 | 0 | DESAVE | EJTAG debug exception save register |

Referring to FIG. 2 a block diagram 200 is shown illustrating the bit fields within a status register (SR) that is located within the control registers 110 of CP0 108. For a description of each of the bit fields within the SR, reference is made to Table 2 below.

TABLE 2

| Fields | | | Read/ |
|---|---|---|---|
| Name | Bits | Description | Write |
| CU | 31:28 | Controls access to Coprocessors 3, 2, 1, and 0, respectively: 0: access not allowed 1: access allowed Coprocessor 0 is always usable when the processor is running in Kernel Mode or Debug Mode, independent of the state of the $CU_0$ bit. If there is no provision for connecting a Coprocessor, the corresponding CU bit must be ignored on write and read as zero. | R/W |
| RP | 27 | Enables reduced power mode on some implementations. The specific operation of this bit is implementation dependent. If this bit is not implemented, it must be ignored on write and read as zero. If this bit is implemented, the reset state must be zero so that the processor starts at full performance. | R/W |
| FR | 26 | Controls the floating point register mode on 64-bit MIPS processors. Not used by MIPS32 processors. This bit must be ignored on write and read as zero. | R |
| RE | 25 | Used to enable reverse-endian memory references while the processor is running in user mode: 0: User mode uses configured endianness 1: User mode uses reversed endianness Neither Kernel Mode nor Supervisor Mode references are affected by the state of this bit. | R/W |
| MX | 24 | If this bit is not implemented, it must be ignored on write and read as zero. Enables access to MDMX* resources on MIPS64* processors. Not used by MIPS32* processors. This bit must be ignored on write and read as zero. | R |
| PX | 23 | Enables access to 64-bit operations on MIPS64 processors. Not used by MIPS32 processors. This bit must ignored on write and read as zero. | R |
| BEV | 22 | Controls the location of exception vectors: 0: Normal 1: Bootstrap | R/W |
| TS | 21 | Indicates that the TLB has detected a match on multiple entries. It is implementation dependent whether this detection occurs at all, on a write to the TLB, or an access to the TLB. When such a detection occurs, the processor initiates a machine check exception and sets this bit. It is implementation dependent whether this condition can be corrected by software. If the condition can be corrected, this bit should be cleared before resuming normal operation. If this bit is not implemented, it must be ignored on write and read as zero. Software writes to this bit may not cause a 0–1 transition. Hardware may ignore software attempts to cause such a transition. | R/W |
| SR | 20 | Indicates that the entry through the reset exception vector was due to a Soft Reset: 0: Not Soft Reset (NMI or Reset) 1: Soft Reset If this bit is not implemented, it must be ignored on write and read as zero. Software may only write a zero to this bit to clear the SR condition. Hardware may ignore software attempts to write a one to this bit. | R/W |
| NMI | 19 | Indicates that the entry through the reset exception vector was due to an NMI 0: Not NMI (Soft Reset or Reset) 1: NMI If this bit is not implemented, it must be ignored on write and read as zero. Software may only write a zero to this bit to clear the NMI condition. Hardware may ignore software attempts to write a one to this bit. | R/W |
| 0 | 18 | Must be written as zero; returns zero on read | 0 |
| Impl | 17:16 | These bits are implementation dependent and not defined by the architecture. If they are not implemented, they must be ignored on write and read as zero. | |
| IM7–IM0 | 15:8 | Interrupt Mask: Controls the enabling of each of the external, internal and software interrupts. 0: interrupt request disabled 1: interrupt request enabled | R/W |
| KX | 7 | Enables access to 64-bit kernel address space on 64-bit MIPS processors. Not used by MIPS32* processors. This bit must be ignored on write and read as zero | R |
| SX | 6 | Enables access to 64-bit supervisor address space on 64-bit MIPS processors. Not used by MIPS32* | R |

TABLE 2-continued

| Fields | | | Read/ |
|---|---|---|---|
| Name | Bits | Description | Write |
| | | processors. This bit must be ignored on write and read as zero. | |
| UX | 5 | Enables access to 64-bit user address space on 64-bit MIPS processors. Not used by MIPS32* processors. This bit must be ignored on write and read as zero. | R |
| KSU | 4:3 | If Supervisor Mode is implemented, the encoding of this field denotes the base operating mode of the processor. The encoding of this field is:<br>00: Base mode is Kernel Mode<br>01: Base mode is Supervisor Mode<br>10: Base mode is User Mode<br>11: Reserved. The operation of the processor is UNDEFINED if this value is written to the KSU field<br>Note: This field overlaps the UM and R0 fields, described below. | R/W |
| ERL | 2 | Error Level; Set by the processor when a Reset, Soft Reset, NMI or Cache Error exception is taken.<br>0: normal level<br>1: error level<br>When ERL is set:<br>The processor is running in Kernel Mode<br>Interrupts are disabled<br>The ERET instruction will use the return address held in ErrorEPC instead of EPC<br>The lower $2^{29}$ bytes of kuseg are tread as an unmapped and uncached region. This allows main memory to be accessed in the presence of cache errors. The operation of the processor is UNDEFINED if the ERL bit is set while the processor is executing instructions from kuseg. | R/W |
| EXL | 1 | Exception Level; Set by the processor when any exception other than Reset, Soft Reset, NMI or cache Error exception is taken.<br>0: normal level<br>1: exception level<br>When EXL is set:<br>The processor is running in Kernel Mode<br>Interrupts are disabled<br>TLB refill exceptions will use the general exception vector instead of the TLB refill vector.<br>EPC and Cause$_{BD}$ will not be updated if another exception is taken | R/W |
| IE | 0 | Interrupt Enable: Acts as the master enable for software and hardware interrupts:<br>0: disable interrupts<br>1: enables interrupts | R/W |

*Information about MIPS32, MIPS64, MDMX architecture specifications are available from MIPS Technologies, Inc of Mountain View, California.

While the invention, as it will be described below, may be implemented to modify the contents of any of these registers, as well as registers within the floating point Coprocessor 112, or the other Coprocessor 114, it will be particularly described with reference to register number 12, called the status register (SR). That is, the present invention can be used to atomically modify bits within a variety of registers, for a variety of different purposes. Atomically implies that modification of the bits is performed without interruption by either the processor or devices outside the processor. Alternatively, atomically implies that the bits are modified by a single instruction being executed by the microprocessor. However, to provide a context for appreciating the novel aspects of the present invention, the discussion below will focus on updating bit 0 of the SR register—the bit associated with enabling and disabling of interrupts for the processor 102. One skilled in the art will readily appreciate how the present invention can alternatively specify other bits within the SR register, or within other registers, to be modified.

Figure 4:
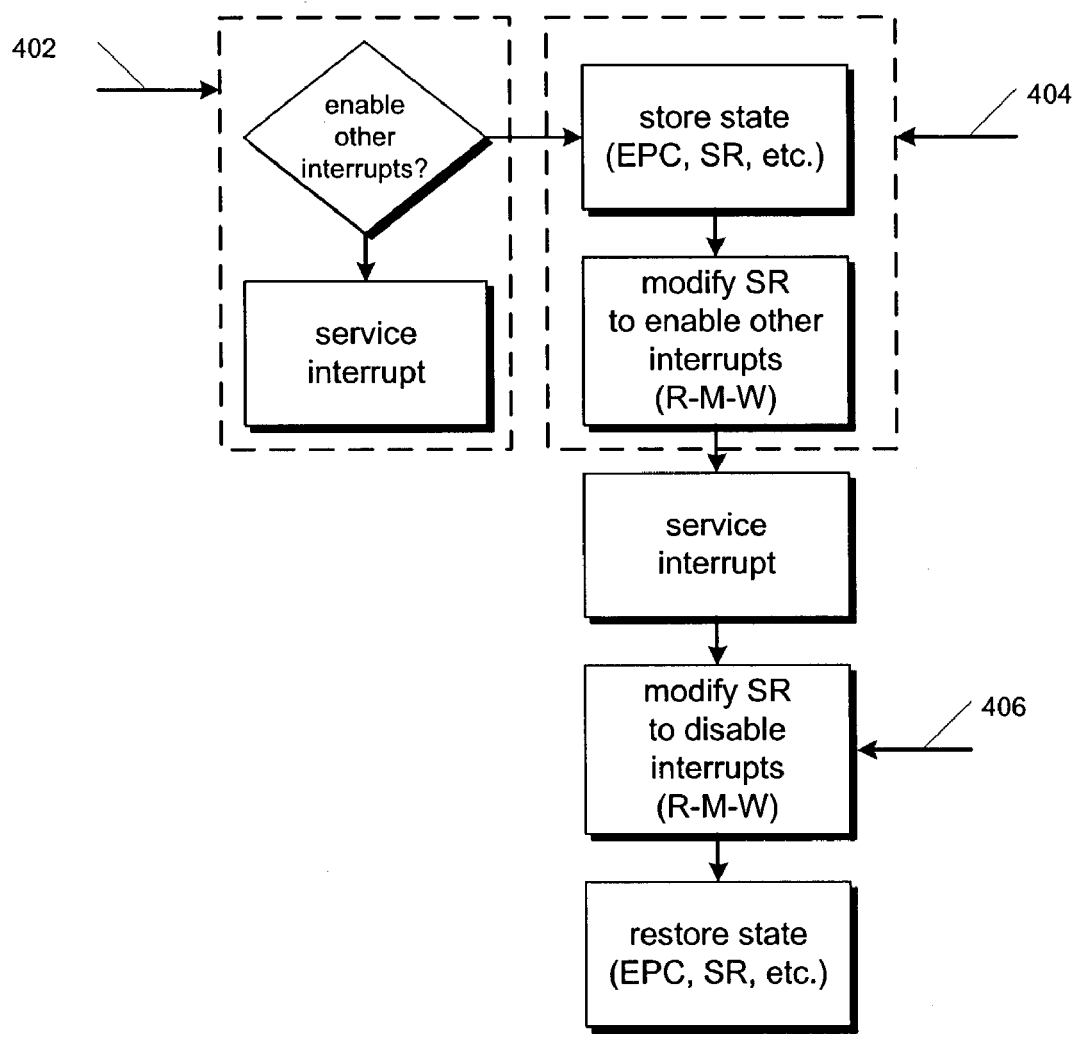
FIG. 4 is a flow chart illustrating one methodology for dealing with an interrupt during the SR update process provided in FIG. 3.
Figure 5:
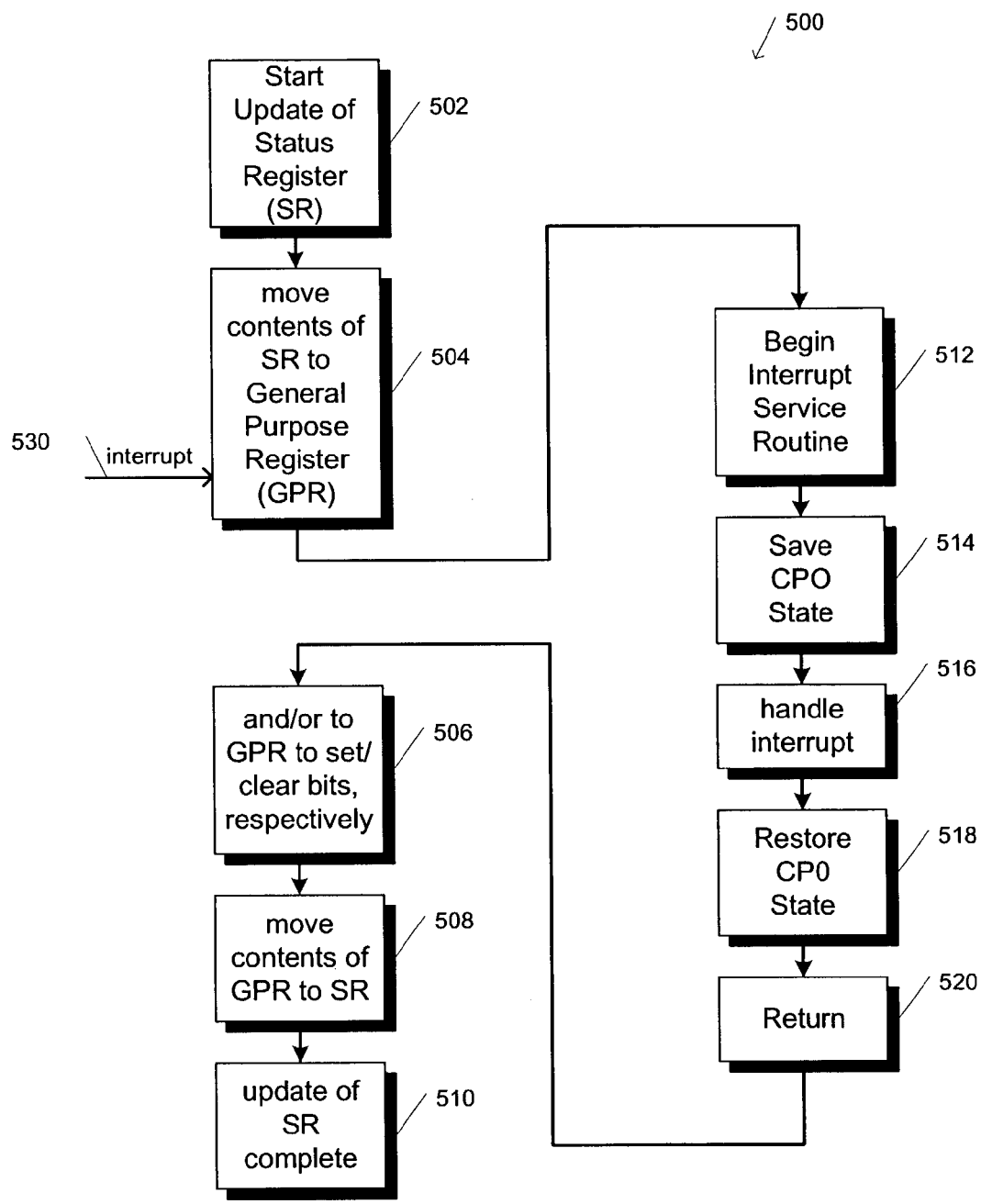
FIG. 5 is a flow chart illustrating a second methodology for dealing with an interrupt during the SR update process provided in FIG. 3.

With the above understanding of the control registers 110 within the control unit 108 of processor 102, an overview will first be provided of interrupt handling within the processor 102, with reference to FIGS. 3-5. An embodiment of the present invention will then be described with reference to FIGS. 6-9.

When an interrupt occurs during execution of either a user program, or in the middle of servicing another interrupt, the CPU 102 may be required to modify bits within the SR register 200. The logical flow of such modification is shown below with reference to FIG. 3.

In FIG. 3, a flow chart 300 is provided that particularly illustrates program flow within the CPU 102 upon occurrence of an interrupt. A user mode program 301 is shown executing, until an interrupt 303 occurs. One skilled in the art will appreciate that the interrupt may occur from any of a number of sources external to the CPU 102, or from the CPU 102 itself. At this point, all instructions that have successfully completed execution within the CPU 102 continue to pass thru remaining pipeline stages (not shown) within the CPU 102. However, instructions that have not yet completed execution are halted, and will be restarted upon return from the interrupt.

Within the MIPS architecture, when an interrupt occurs, the interrupt will be serviced by the CPU 102 if: 1) interrupts are enabled (the IE bit within the SR register is set); 2) the mask bit (IM0-7) for the particular interrupt is set; and 3) the EXL bit is clear. Otherwise, the CPU 102 will ignore interrupts. More specifically, if the CPU 102 is in user mode, the EXL bit is clear. When an interrupt occurs, the interrupt will cause the EXL bit to be set, thereby disabling all further interrupts until the EXL bit is cleared. So, if the CPU 102 is in user mode when interrupt 303 occurs, the EXL bit is set by the interrupt, and instruction flow proceeds to decision block 302. The EXL bit is described above in Table 2.

At decision block 302 a determination is made as to whether the interrupt will require very little processing, or significant processing (as determined from the type of interrupt). If the interrupt serviced by the routine can be completed in just a few instructions, the programmer may allow the EXL bit to remain set, thereby disabling further interrupts while servicing the interrupt. If the programmer determines that the interrupt will require very little processing, and that there is no need to re-enable other interrupts, flow proceeds to block 304. Otherwise, flow proceeds to block 306.

At block 304, the interrupt is serviced. Upon completion of servicing the interrupt, the CPU 102 executes a return from exception instruction to cause the processor to jump back to user mode where it left off. In addition, the return from exception instruction clears the EXL bit to allow interrupts.

Back at decision block 302, if the interrupt requires more significant time to process, the programmer may wish to re-enable other interrupts before proceeding with the processing. Flow therefore proceeds to block 306.

At block 306, the state of the CPU 102 is stored to memory. One skilled in the art will appreciate that the state of the processor includes the contents of the EPC register (i.e., the register holding the contents of the program counter prior to jumping to the exception handler), the SR, and possibly other state information. The state of the processor is stored prior to enabling interrupts so that if the exception routine is interrupted, and the contents of SR and/or EPC get overwritten, they may later be restored. Flow then proceeds to block 308.

At block 308 interrupts are re-enabled. To accomplish this, the programmer clears the EXL bit, and modifies the contents of the interrupt mask bits (IM0–7) to disable the interrupt bit pertaining to the present interrupt, while enabling other interrupts. Clearing and modification of bits in the SR register have not, prior to the present invention, been modified directly. Rather, bits in status registers, such as SR, are first moved into the GPR 106, then modified, and then moved back to the SR. So, at block 308 the contents of the SR register are moved to a register within the GPR 106. Then, according to the exception handler program, particular bits within the SR are set or cleared in the copy of SR that was moved to GPR 106. Such bits include the interrupt mask bits IM0–7, the EXL bit, and possibly the interrupt enable bit (IE). After modification, the contents of the register in GPR 106 that contains the modified fields within the SR are moved back into the SR register. At this point, updating of the SR register is complete, and interrupts are re-enabled. One skilled in the art will appreciate at this point that the R-M-W sequence has not been interrupted because during the modification, the EXL bit is still set. Flow then proceeds to block 310.

At block 310, the service routine for the particular interrupt executes. Upon completion of servicing the interrupt, it is necessary to restore the state of the CPU 102 to the state it was in before the interrupt occurred. However, since restoring the state of the processor requires a R-M-W sequence that may itself be interrupted, interrupts are first disabled. This is shown at block 312.

At block 312, the contents of the SR register are moved to a register in the GPR 106, the interrupt enable (IE) bit is cleared thereby disabling interrupts, and the contents of the register in the GPR 106 are moved back to the SR. Once the IE bit in the SR has been cleared, the state of the CPU 102 may be restored without fear of being interrupted. Flow then proceeds to block 314.

At block 314, the state of the CPU 102 is restored. EPC is restored from memory, SR is restored from memory, and any other state information that was stored in block 306 is restored. A return from the exception places the contents of EPC into the program counter of the CPU 102 to cause instruction flow to begin again at the point of interruption.

The flow chart of FIG. 3 is provided to particularly illustrate several aspects of interrupt handling. The first is that when an interrupt occurs, a context switch is made to kernel mode within the CPU 102, unless of course the CPU 102 is already executing in kernel mode (in which case a switch is made to Kernel mode with the EXL bit being set). That is, interrupt service routines, exception handlers, etc., that require access to the control registers 110 within the CPU 102, operate in a different, i.e., higher privilege level than user programs (since user programs do not have access to the control registers 110).

In addition, when an interrupt occurs, if the service routine requires more than a few instructions to execute, the state of the processor must first be stored into memory, and interrupts re-enabled. Upon completion of servicing the interrupt, the state of the processor must be restored. However, since interrupts may still occur, interrupts must first be disabled prior to restoring the state of the processor. But, to disable interrupts, a R-M-W sequence must occur between the SR and the GPR 106, a sequence which itself might be interrupted.

FIG. 4 provides a flow chart 400 illustrating the effect of multiple interrupts while handling the first interrupt described above in FIG. 3. Suppose an interrupt 402 occurs prior to deciding whether the first interrupt is going to be time consuming, or while handling a short interrupt. At this point, interrupt 402 will be ignored because the EXL bit remains set, thereby disabling all interrupts. Therefore, no problem occurs with respect to the state of the CPU 102, or the SR register.

Suppose an interrupt 404 occurs while the state of the CPU 102 is being saved, or while other interrupts are being enabled at block 306. At this point, the EXL bit is still set thereby disabling interrupt 404. The state of the CPU 102 is preserved, and the instruction flow that modifies the SR is preserved. Still there is no problem.

Suppose however that an interrupt 406 occurs after interrupts have been re-enabled. Recall that to insure that the CPU 102 returns to the state that it was in prior to handling the first interrupt, its state at the time of the first interrupt must be restored. The restoration of the state of the SR however is a R-M-W sequence that itself may be interrupted. That is why block 312 disables interrupts prior to restoring the state of the CPU 102. But, block 312 may itself be interrupted. If this occurs, it is possible that the state of the CPU 102 might not be restored to the condition it was in before the interrupt. Such an instance can be disastrous.

Referring now to FIG. 5, a flow chart 500 is shown that illustrates a methodology for insuring that the R-M-W sequence of block 312 is not prevented from accomplishing its purpose completing and proceeding to block 314. More specifically, FIG. 5 illustrates a requirement that all interrupt service routines be strictly nested. That is, that all interrupts store the state of CP0 prior to proceeding, restore it upon completion, and always return to the location they interrupted.

Flow starts at block 502 where update of the SR begins (such as the disabling of interrupts by clearing the IE bit, as shown in block 312). Flow then proceeds to block 504.

At block 504, the contents of the SR register are moved to the GPR 106. At this point, an interrupt 530 occurs. Since the interrupt 530 has not been disabled, program flow jumps to an exception handler that begins an interrupt service routine, at block 512. Flow then proceeds to block 514.

At block 514, to insure that the contents of the SR are not lost, at least at the point of the interrupt, the state of the CP0 108, including the SR register, is saved. Flow then proceeds to block 516.

At block 516, the interrupt 530 is serviced by an appropriate interrupt service routine. One skilled in the art will appreciate that the interrupt service routine may change the state of the SR register. Flow then proceeds to block 518.

At block 518, the state of CP0, including the SR register is restored to the condition it was in before servicing interrupt 530. Flow then proceeds to block 520.

At block 520, a return from interrupt is executed that places program execution back in the R-M-W sequence, at block 506. Instruction flow then proceeds thru blocks 506, 508, and 510 to complete the update of the SR.

At least two aspects of the solution presented in FIG. 5 should be clear to one skilled in the art. First, the instruction flow of FIG. 5 insists that no interrupt service routine be allowed to change the contents of SR. That is, whatever else happens during servicing of an interrupt, at the end of the interrupt, the service routine must restore the contents of the SR that existed when the service routine began. As mentioned above, this imposition is unacceptable in many environments. Second, the instruction flow presented in FIG. 5 insists that all interrupt service routines be strictly nested. That is, whenever a departure in normal program flow occurs, as a result of an interrupt, the interrupt service routine is required, upon completion, to return to the point of departure. This requirement is common in some programming environments, but in many real-time environments, such as network routing, strict nesting of interrupt service routines is not desired. Moreover, in some environments, substantial program code has already been developed that does not enforce strict nesting of interrupts, and rewriting of the code to overcome the R-M-W problems described above would be too time consuming, as well as too costly.

The problem described above with reference to FIGS. 3–5 is just one of many problems that occur within the processing environment 100 when the contents of control registers cannot be modified atomically. For these reasons, the instruction encoding methodology of the present invention is desired, and will now be described with reference to FIGS. 6–9.

Figure 6:
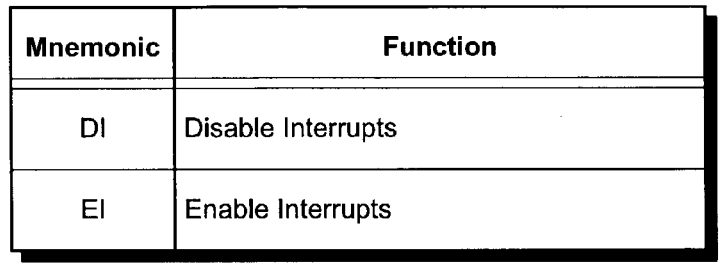
FIG. 6 is a table illustrating two instructions for atomically updating a privileged architecture register within a microprocessor.

Referring first to FIG. 6, a table 600 is provided that illustrates two new instructions that are being added to the MIPS32 and MIPS64 architecture. The instructions include: DI, and EI. The DI instruction disables interrupts by atomically clearing an IE bit within the SR register of the Coprocessor 0. The EI instruction enables interrupts by atomically setting the IE bit within the SR register of the Coprocessor 0.

Figure 7:
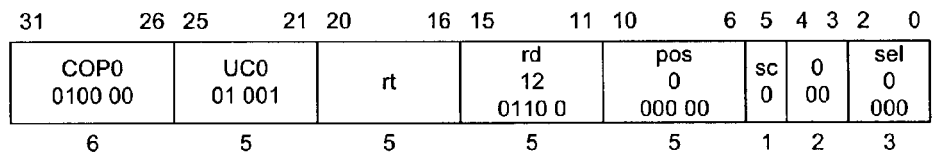
FIG. 7 is a block diagram illustrating the bit architecture for a DI instruction according to the present invention.

FIG. 7 provides a block diagram 700 of the 32-bit COP0 opcode for the instruction DI (Disable Interrupt). The purpose of the DI instruction is to atomically clear the IE bit within the status register of Coprocessor 0, and if requested, to move the current value of the status register into the general purpose register rt. The format of the instruction is:

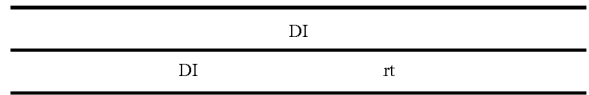

and is described as follows:
   rt←Status; Status$_{IE}$←0

When the DI instruction is executed, the current value of the status register is sign extended and loaded into general purpose register rt. Also, the Interrupt Enable (IE) bit in the status register is cleared. If access to the Coprocessor 0 is not enabled at the time DI begins execution, a Coprocessor Unusable Exception is signaled.

The effect of executing the DI instruction is similar to that accomplished by a sequence of reading the status register into a GPR (using MFC0—an instruction within the MIPS architecture), clearing the IE bit, and writing the result back to the status register (using MTC0—another instruction within the MIPS architecture). However, unlike the multiple instruction sequence, the DI instruction is atomic, and thus cannot be aborted in the middle by an interrupt or exception.

One skilled in the art should appreciate that the DI instruction is merely one implementation of any number of instructions that could be used to atomically set or clear specified bits within specified privileged architecture registers. For such other instructions, the sc field in bit position 5 is a variable, capable of containing a value of "0" to indicate that a bit field is to be cleared (as in the case of the DI instruction), or a value of "1" to indicate that a bit field is to be set (as in the case of the EI instruction shown below). The COP0 opcode indicates that the instruction is designated for Coprocessor 0. If a bit is to be set or cleared within an alternate Coprocessor, a different opcode would be used. The UC0 function indicates that the Coprocessor is to atomically set or clear a value in any bit position (as specified by the pos field—bit positions 6–10) within a 32-bit Coprocessor 0 register specified by the rd and sel fields. For purposes of this discussion, the terms fields and operands are used interchangeably to refer to areas within an instruction that specifies locations to be modified. For the DI instruction, a pos value of 000 00 indicates bit position 0, of the SR register which is designated as rd=0110 0, and sel=000. Thus, when the decode logic 105 receives the DI instruction, it must decode the rd, pos and sel fields to determine which field, within which register, within the Coprocessor 0 is to be set or cleared, as designated by the sc field. If it is desired to set or clear other bits within the same or other privileged architecture registers, an instruction according to the present invention would be encoded with rd and sel bits to specify the register of interest, and the pos field would be encoded to specify the particular bit of interest. Of course, the sc field would be encoded with either a "0" or a "1" to clear or set the specified bit, respectively.

Figure 8:
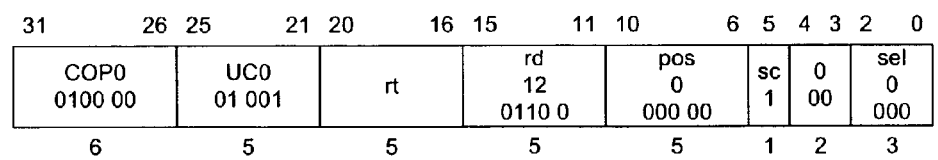
FIG. 8 is a block diagram illustrating the bit architecture for an EI instruction according to the present invention.

The below operation specification is for the DI instruction:
   if IsCoprocessorEnabled(0) then
   data←Status
   GPR[rt]←sign_extend(data)
   Status$_{IE}$←0
   else
   SignalException(CoprocessorUnusable, 0)
   endif Referring now to FIG. 8, a block diagram 800 is shown specifying the 32-bit COP0 opcode for the instruction EI (Enable Interrupt). The purpose of the EI instruction is to atomically set the IE bit within the status register of Coprocessor 0, and if requested, to move the value of the status register into the general purpose register rt. The format of the instruction is:

and is described as follows:
   rt←Status; Status$_{IE}$←1

When the EI instruction is executed, the current value of the status register is sign extended and loaded into general register rt. Also, the Interrupt Enable (IE) bit in the status register is set. If access to the Coprocessor 0 is not enabled at the time EI begins execution, a Coprocessor Unusable Exception is signaled.

The effect of executing the EI instruction is similar to that accomplished by the sequence of reading the status register into a GPR (using MFC0), setting the IE bit, and writing the result back to Status (using MTC0). However, unlike the multiple instruction sequence, the EI instruction is atomic, and thus cannot be aborted in the middle by an interrupt or exception.

The below operation specification is for the EI instruction:
   if IsCoprocessorEnabled(0) then
   data←Status
   GPR [rt]←sign_extend (data)
   Status$_{IE}$←1
   else
   SignalException(CoprocessorUnusable, 0)
   endif The above discussion of FIGS. 7–8, describes the operation of each of two special instances of instruction encoding to effect atomic update of privileged architecture registers according to the present invention. That is, the two instructions described are used to atomically clear and set the IE bit within the status register. However, one skilled in the art should appreciate that these two instructions are merely a subset of possible instructions that can be encoded to atomically set or clear any number of bits within any number of architecturally privileged registers.

Figure 9:
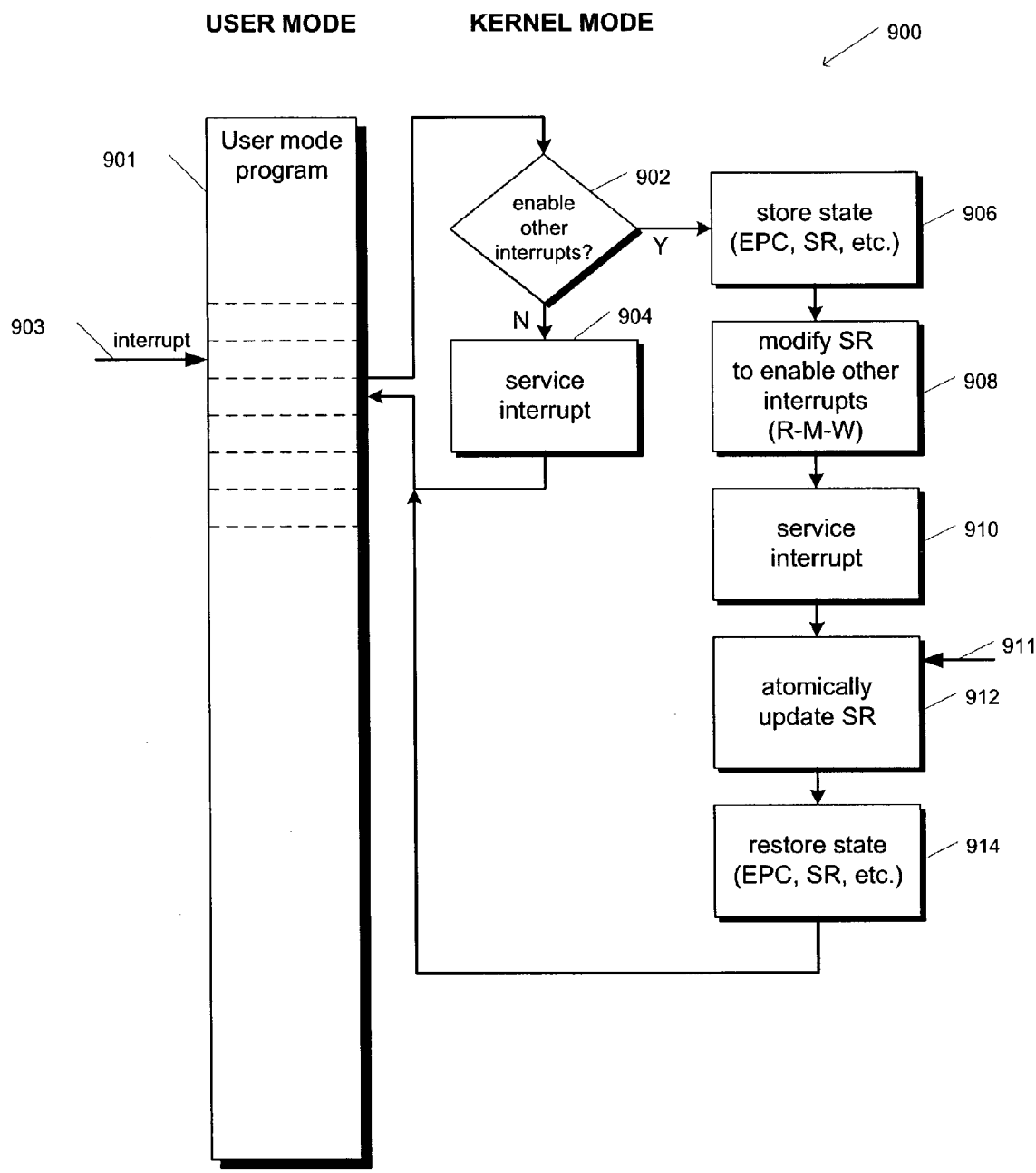
FIG. 9 is a flow chart illustrating the impact of an interrupt receiving during an atomic update of a privileged architecture register using the atomic update instructions illustrated in FIGS. 6–8.

To better comprehend the application of these instructions, within the context of an interrupt, reference is now directed to FIG. 9. FIG. 9 provides a flow chart 900 that illustrates the benefit of the atomic update instructions to modify the state of the SR register, particularly when disabling interrupts by clearing the IE bit. During execution of a user program 901, an interrupt 903 occurs. Instruction flow jumps to an exception handler responsible for handling the interrupt 903. Instruction flow proceeds similarly to that described above with reference to FIG. 3. However, at block 912, the DI atomic update instruction as described above with reference to FIGS. 6–8 is used to update the contents of SR, without requiring the R-M-W sequence described above, thereby atomically disabling interrupts. Thus, when the interrupt 911 occurs during execution of block 912, it is not serviced because interrupts will have already been disabled by the atomic instruction. Moreover, if requested, the previous contents of the SR register will have been transferred into the rt register of the GPR. This allows the previous value of the SR register to be examined by the exception handler, or the previous value of the SR register to later be restored, if necessary.

More generally, depending on whether an exception handler wishes to set or clear bits in the SR, the exception handler utilizes one of the instructions shown in FIG. 6. If the programmer of the exception handler wishes to enable interrupts, s/he will use the EI instruction. If the programmer wishes to disable interrupts, s/he will use the DI instruction. As mentioned above, the IE bit within the SR will be set or cleared based on the encoding of the sc field within the instruction.

One skilled in the art will appreciate that since selected bit fields in the SR register, or any other of the control registers 110, are set atomically (i.e., within a single cycle), there is no requirement that interrupt service routines be strictly nested. Nor is there any requirement that interrupts be disabled during modification of any of the control registers, such as when restoring the state of the CPU 102. Thus, utilization of the present invention, to encode particular instructions for setting and clearing the IE bit within the SR register imposes none of the previous limitations relating to interrupt handling (e.g., disabling of interrupts, strict nesting of interrupt service routines, etc.), while enhancing a kernel programs ability to modify selected control registers 110 without a R-M-W sequence. Furthermore, when modification of a control register 110 is desired, it may be accomplished more efficiently since such modification requires only a single processing cycle.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Also, although the Coprocessor interface has been described with particular reference to the MIPS32 and MIPS64 Instruction Set Architecture, one skilled in the art will appreciate that the applicability of the atomic update of privileged resources is not limited to such architecture. The embodiment described above, with respect to the DI and EI instructions are merely illustrative of the novel idea of encoding within an instruction, which privileged architecture registers are to be affected, and which bit or bits within a privileged architecture register is to be set or cleared. Another instruction, or pair of instructions, might be encoded to set or clear one or more of the interrupt mask bits IM0–7 in bit positions 8–15 within the SR register. Such instructions would be encoded by specifying either an alternate bit location (within the pos field), or possibly multiple alternate bit locations (within one or more pos fields). The particular fields described with reference to FIGS. 7–8, that designate which privileged architecture register is to be affected, and which bit within the designated register is to be affected, should not be restrictive. That is, larger or smaller fields may be used within a particular instruction architecture to designate more or less privileged architecture registers, or more or less bits within a designated register, without departing from the scope of the present invention. In addition, multiple fields might be used to specify more than one bit to be atomically set or cleared within a designated privileged architecture register.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for atomically setting or clearing a bit field within a privileged architecture register of a microprocessor without first reading the contents of the privileged architecture register, the method comprising:

providing a privileged instruction which instructs the microprocessor to set or clear the bit field within the privileged architecture register, the privileged instruction comprising:

a first operand not stored in a register for specifying which one of a plurality of privileged architecture registers contains the bit field to be set or cleared, and a designator for specifying whether the bit field is to be set or cleared;

when the microprocessor is in privileged mode, decoding the privileged instruction by examining the first operand to determine which one of the plurality of privileged architecture registers contains the bit field without accessing a register containing a bit mask of bits to set or clear in the privileged architecture register, and by examining the designator to determine whether the bit field is to be set or cleared; and executing the privileged instruction thereby causing the bit field to be atomically set or cleared according to the designator.

2. The method as recited in claim 1 wherein the privileged mode is the kernel mode of the microprocessor.

3. The method as recited in claim 1 wherein the privileged architecture register comprises a plurality of bit fields including the bit field to be set or cleared.

4. The method as recited in claim 1 wherein the bit field is an interrupt enable field.

5. The method as recited in claim 1 wherein the privileged instruction further comprises:

a second operand for specifying which one of a plurality of bit fields within a specified one of the plurality of privileged architecture registers is to be set or cleared.

6. The method as recited in claim 5 further comprising:

decoding the second operand to determine which one of a plurality of bit fields within the specified one of the plurality of privileged architecture registers is to be set or cleared.

7. A method for atomically setting or clearing a bit field in a privileged architecture register of a microprocessor, comprising:

providing a privileged instruction that instructs the microprocessor to set or clear the bit field, the privileged instruction comprising:

a first operand to specify which one of a plurality of privileged architecture registers contains the bit field, wherein the first operand does not identify a register that holds a bit mask for setting or clearing bits in the field; and a designator to specify whether to set or clear the bit field;

decoding the privileged instruction when the microprocessor is in a privileged mode by:

examining the first operand to determine which privileged architecture register contains the bit field; and examining the descriptor to determine whether to set or clear the bit field; and executing the privileged instruction to atomically set or clear the bit field without first reading the contents of the privileged architecture register.

8. The method as recited in claim 7 wherein the privileged mode is the kernel mode of the microprocessor.

9. The method as recited in claim 7 wherein the privileged architecture register comprises a plurality of bit fields including the bit field to be set or cleared.

10. The method as recited in claim 7 wherein the bit field is an interrupt enable field.

11. The method as recited in claim 7 wherein the privileged instruction further comprises:

a second operand for specifying which one of a plurality of bit fields within a specified one of the plurality of privileged architecture registers is to be set or cleared.

12. The method as recited in claim 11 further comprising:

decoding the second operand to determine which one of a plurality of bit fields within the specified one of the plurality of privileged architecture registers is to be set or cleared.

* * * * *

UNITED STATES PATENT AND TRADEMARK OFFICE
CERTIFICATE OF CORRECTION

PATENT NO. : 7,634,638 B1 Page 1 of 1
APPLICATION NO. : 10/279210
DATED : December 15, 2009
INVENTOR(S) : Michael Gottlieb Jensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Ninth Day of November, 2010

David J. Kappos
*Director of the United States Patent and Trademark Office*